United States Patent [19]

Rosenkrands

[11] 4,405,143
[45] Sep. 20, 1983

[54] HINGE CONNECTION FOR ARTICULATED VEHICLES

[75] Inventor: Johannes W. Rosenkrands, Rochester, Mich.

[73] Assignee: General Motors Corporation, Detroit, Mich.

[21] Appl. No.: 303,393

[22] Filed: Sep. 18, 1981

[51] Int. Cl.³ .......................... B62D 53/00; B60D 1/00
[52] U.S. Cl. ........................................ 280/403; 105/3;
105/8 R; 105/18; 280/424; 280/432; 280/492
[58] Field of Search ............... 280/403, 400, 405 R,
280/406 R, 407, 424, 426, 492 R, 442, 468;
105/3, 8, 15, 18; 308/3, 3.9; 296/1 R, 1 S, 178

[56] References Cited

U.S. PATENT DOCUMENTS 2,843,417  7/1958  Wahl et al. .................... 280/403 X

FOREIGN PATENT DOCUMENTS

2748713  5/1979  Fed. Rep. of Germany .......... 105/3
2748714  5/1979  Fed. Rep. of Germany ...... 280/432
7811557  5/1980  Netherlands ............................ 105/3
389005  6/1965  Switzerland ........................ 280/403

Primary Examiner—Joseph F. Peters, Jr.
Assistant Examiner—Mitchell J. Hill
Attorney, Agent, or Firm—Biskup E. J.

[57] ABSTRACT

A hinge connection for an articulated vehicle having a front section provided with two longitudinally spaced nondriven axles and a rear section provided with a single driven axle. The hinge connection is characterized in that it includes a pair of hinge members which, together with a linkage mechanism, are connected to a transversely extending shaft member so as to provide angular movement of each section of the vehicle about a pair of mutually perpendicular axes while ensuring that the longitudinal center axis of the shaft member always bisects the angle between the front and rear sections when the vehicle is in a turn.

7 Claims, 11 Drawing Figures

HINGE CONNECTION FOR ARTICULATED VEHICLES

This invention concerns articulated vehicles in general and, more particularly relates to a hinge connection which joins the front section of an articulated vehicle to the rear section thereof and allows relative angular displacement between the two sections both in a horizontal plane and in a longitudinal vertical plane.

More specifically, the present invention concerns a hinge connection for a three-axle articulated bus in which the front section includes front and center non-driven axles, and the rear section has a single driven axle and an engine located at the rear end thereof. The rear section of the bus serves as a "pusher" unit to drive the front section through the hinge connection, and steering of the bus is effected through a pair of dirigible wheels mounted on the front axle of the front section.

In the preferred form, the hinge connection made in accordance with the present invention includes a hinge member mounted on the front section and a similar hinge member mounted on the rear section. Each hinge member provides a vertical axis about which the associated section of the bus can pivot, and each member is connected to a transversely extending and horizontally orientated shaft member located midway between the hinge members. The shaft member provides a horizontal transversely extending pivot axis about which the front and rear sections pivot when the bus is traveling over a crest or dips in the road. Also, a pair of links are located on each side of the hinge members—between the front and rear sections of the bus—and are pivotally connected to a slider member located on the above-mentioned shaft member. This link-slider mechanism ensures that the transverse pivot axis provided by the shaft member will always bisect the angle between the front and rear sections, thereby also ensuring proper positioning of the two vertical pivot axes provided by the hinge members with respect to the front and rear sections when the bus is in a turn or traveling straight ahead.

In addition, a pair of spring members are provided on each side of the hinge members—with one of the spring members extending between the front section and the shaft member, and the other extending between the rear section and the shaft member. The arrangement is such that when the bus is traveling in a straight-ahead direction, the spring members will apply a substantially equal-and-opposite torque to the two sections of the bus about the two vertical pivot axes provided by the hinge members.

The objects of the present invention are: to provide a new and improved hinge connection for joining the rear section to the front section of an articulated vehicle; to provide a new and improved hinge connection for an articulated vehicle that provides a pair of longitudinally spaced vertical pivot axes and a horizontal pivot axis which, together, allow one of the sections of the vehicle to move angularly relative to the other section when the vehicle is negotiating a turn or is traveling over a crest or dip in the road; to provide a new and improved hinge connection for an articulated vehicle having a front section provided with a pair of longitudinally spaced nondriven front and center axles, and a rear section provided with a driven rear axle, and wherein the hinge connection includes spring means located between the front and rear sections that serve to reduce the side force on the center axle tires when tractive force is applied to the rear axle tires of the rear section while the vehicle is in a turn; to provide a new and improved hinge connection for an articulated vehicle that allows relative angular movement of the front and rear sections of the vehicle about a pair of longitudinally spaced vertical axes, and which includes air-spring means between the front and rear sections on opposite sides of the vertical axes that are connected with a source of pressurized air when the vehicle is moving in a straight-ahead direction, and are automatically disconnected from the source of pressurized air when the vehicle negotiates a turn; to provide a new and improved hinge connection for an articulated vehicle that includes a pair of longitudinally spaced hinge members which, together with link members, are connected to a transversely extending shaft member so as to provide angular movement of each section of the vehicle about a pair of mutually perpendicular axes while ensuring that the longitudinal center axis of the shaft member bisects the angle between the two sections when the vehicle is in a turn; and to provide a new and improved hinge connection for interconnecting the front and rear sections of an articulated vehicle for relative pivotal movement about a pair of vertical pivot axes, and wherein the hinge connection includes means for damping angular relative movements between the two sections around the pair of vertical pivot axes.

These and other objects and advantages of the invention will be more apparent from the following detailed description, taken in conjunction with the accompanying drawings, in which.

Figure 1:
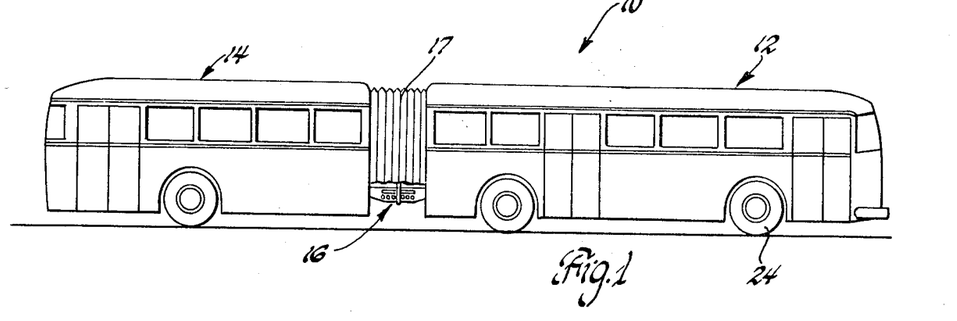
FIG. 1 is an elevational view of an articulated bus traveling in a straight-ahead direction and having the front and rear sections thereof interconnected by the hinge connection made in accordance with the present invention.
Figure 2:
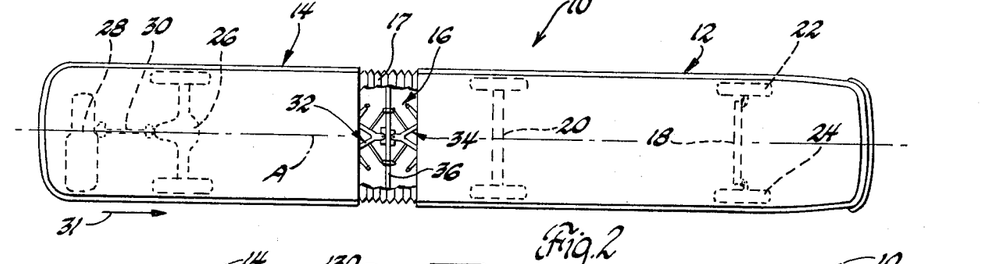
FIG. 2 is a plan view of the articulated bus of FIG. 1, with a portion of the bellows between the front and rear sections broken away to show the hinge connection of the present invention.

Referring now to the drawings and more specifically FIGS. 1 and 2, an articulated vehicle or bus 10 is shown that includes a front section 12 and a rear section 14 which are interconnected by a hinge connection 16 made in accordance with the present invention. A bellows 17 is connected to the front and rear sections 12 and 14 so that the area above the hinge connection can be used as a sealed passageway and provide additional seating space for passengers.

As shown in FIG. 2, the front section 12 of the bus 10 is provided with nondriven front and center axles 18 and 20, the former of which rotatably supports laterally spaced dirigible wheels 22 and 24 for allowing the front section 12 to negotiate turns as it is driven along the road. The rear section 14 is provided with a driven rear axle 26 which obtains power from an engine 28 through a suitable drive train which includes a drive shaft 30. Thus, the rear section 14 serves as a power unit for driving the articulated bus 10 in the direction of the arrow 31, and in this instance, the rear section 14 drives the front section 12 through the hinge connection 16 which serves to maintain the two sections of the bus 10 in proper alignment during straight-ahead travel while allowing angular displacement between the two sections about a vertical axis when the bus is in a turn and about a horizontal axis when traveling over crests and valleys.

Figure 3:
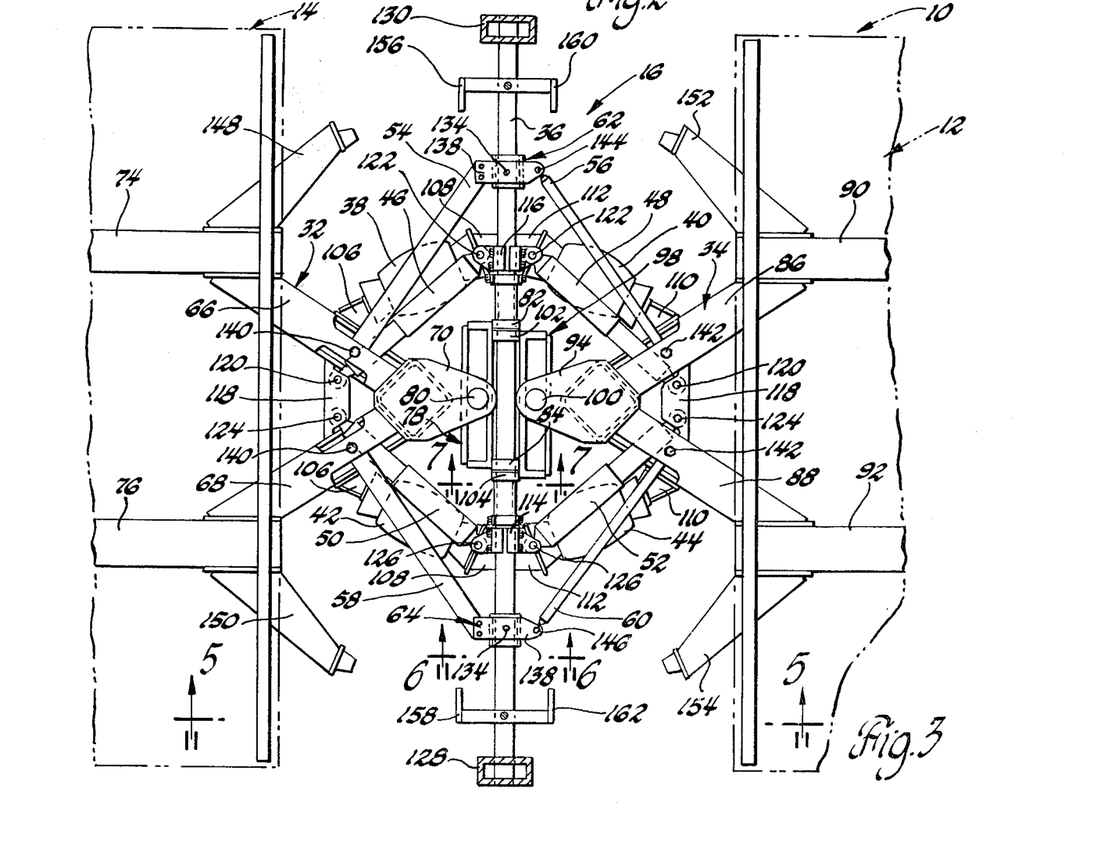
FIG. 3 is an enlarged plan view of the hinge connection shown in FIGS. 1 and 2.
Figure 9:
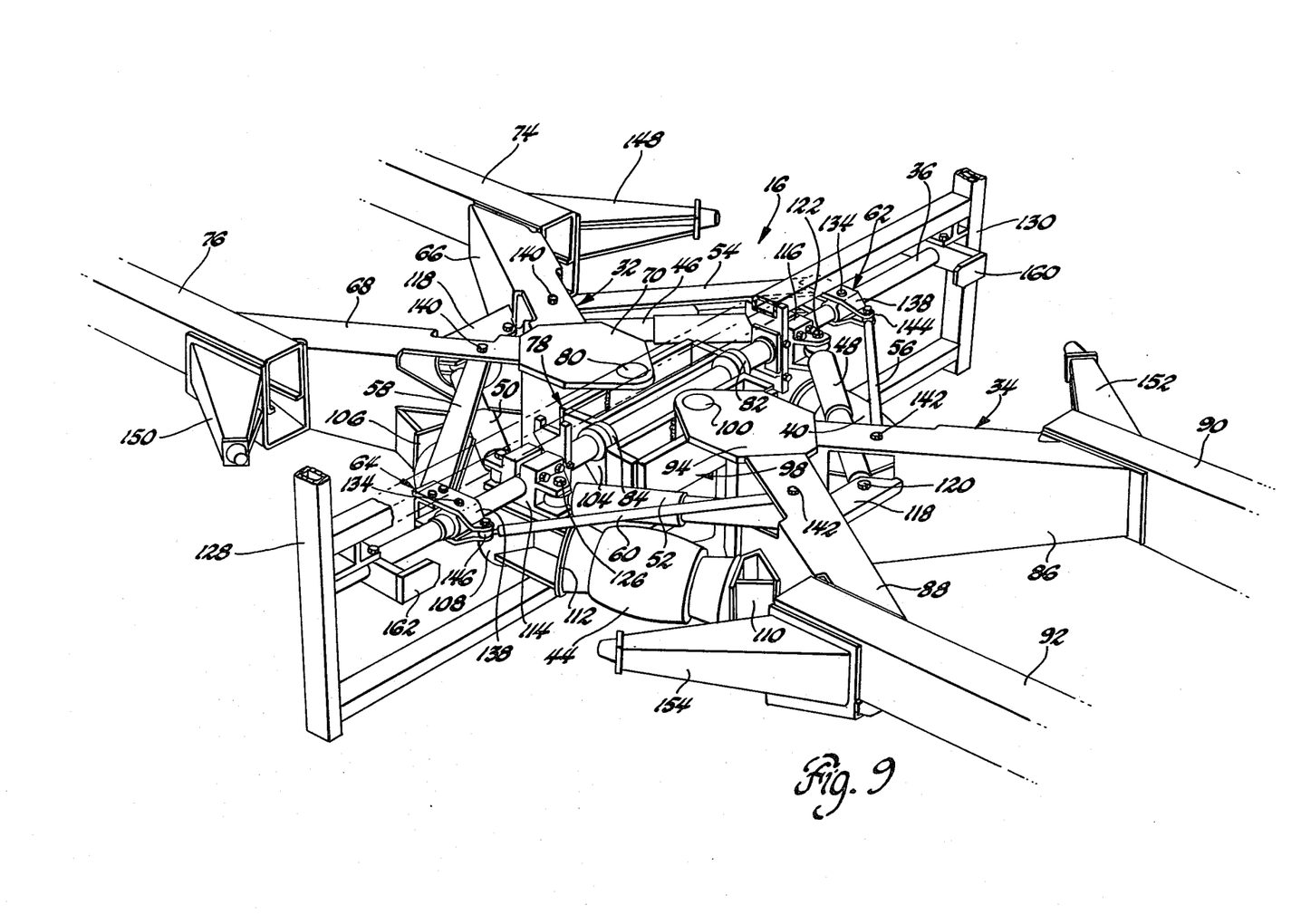
FIG. 9 is a perspective view of the hinge connection shown in FIGS. 1 through 7.

As best seen in FIGS. 3 and 9, the hinge connection 16 comprises a pair of hinge members 32 and 34, a transversely extending shaft member 36, air-springs 38, 40, 42, and 44, and hydraulic dampers 46, 48, 50 and 52. The hinge connection 16 also includes a linkage mechanism which comprises link members 54, 56, 58, and 60, and a pair of slider assemblies 62 and 64 mounted on the shaft member 36 for movement therealong, as will be hereinafter more fully explained.

Figure 5:
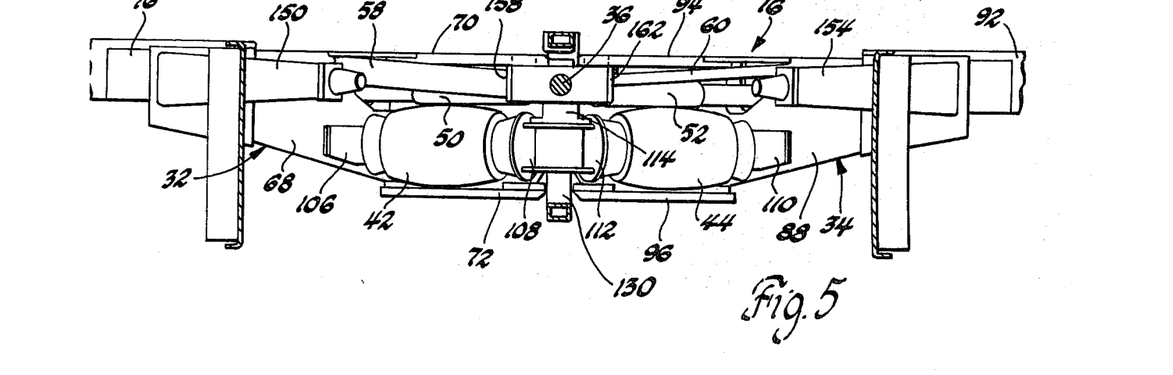
FIG. 5 is an elevational view of the hinge connection taken on line 5—5 of FIG. 3.

As seen in FIGS. 3 and 5, the hinge member 32 is of yoke configuration and includes a pair of converging beam members 66 and 68 which are fixed at one end to vertically spaced upper and lower plate members 70 and 72 and secured at the other end to longitudinally extending frame members 74 and 76 of the vehicle rear section 14. The plate members 70 and 72 straddle a trunnion member 78 which rigidly supports a vertically orientated pin 80, the upper and lower ends of which are journaled in the upper and lower plate members 70 and 72, respectively. The trunnion member 78 also includes a pair of forwardly projecting ears 82 and 84 which are rotatably mounted on an intermediate portion of the shaft member 36 the center longitudinal axis of which is located in a horizontal plane.

The hinge member 34 is substantially identical in construction to the hinge member 32 and also includes a pair of converging beam members 86 and 88, each of which is secured at one end to the laterally spaced and longitudinally extending frame members 90 and 92 of the vehicle front section 12. The other ends of the beam members 86 and 88 are fixed with upper and lower plate members 94 and 96, respectively, which also straddle a trunnion member 98 which is identical in construction to trunnion member 78. The trunnion member 98 rigidly supports a vertically oriented pin 100, the opposite ends of which are journaled in the upper and lower plate members 94 and 96, and also includes a pair of transversely spaced ears 102 and 104 which, in this instance, project rearwardly and are rotatably mounted on the shaft member 36 adjacent the ears 82 and 84 formed on the trunnion member 78.

Thus, it should be apparent from the foregoing description that the front and rear sections 12 and 14 are capable of pivoting relative to each other in opposite directions about the vertical center axes of the trunnion pins 80 and 100 and also capable of pivoting about the horizontal center axis of the shaft member 36. This construction allows the bus 10 to negotiate turns and travel over crests and valleys in a road surface.

As seen in FIGS. 3 and 5, the four air-springs 38, 40, 42, and 44 are arranged in sets of two along each side of the hinge members 32 and 34. In this regard, it will be noted that the longitudinal center axis of each air-spring 38, 40, 42, and 44 is located in a horizontal plane below the shaft member 36 when the bus 10 is on a level surface. Also, the opposite ends of each of the air-springs 38 and 42 are connected to support blocks 106 and 108 rigidly fixed to the hinge member 32 and the shaft member 36, respectively. Similarly, the opposite ends of the air-springs 40 and 44 are connected to support blocks 110 and 112 secured to the hinge member 34 and shaft member 36, respectively. It will also be noted that (as seen in FIG. 9) the support blocks 108 and 112 associated with air-springs 42 and 44 are interconnected and secured to a clamp member 114 fixed to the shaft member 36 adjacent to ear 104 of trunnion member 98. Also, the support blocks 108 and 112 associated with air-springs 38 and 40 are also interconnected and secured to a clamp member 116 which is fixed to the shaft member 36 and located adjacent to ear 82 of trunnion member 78.

The hydraulic dampers 46, 48, 50, and 52 are located in parallel with air-springs 38, 40, 42 and 44, respectively, and serve to dampen erratic and undesirable angular relative movements between the front and rear sections 12 and 14 of the bus 10 about the vertical center axis of the pins 80 and 100 that might occur as a result of road induced vibrations. As seen in FIG. 3, one end of each hydraulic damper 46 and 48 is connected to a cross-member 118 fixed to the associated hinge member by a spherical connection 120, while the other end of each hydraulic damper 46 and 48 is connected to the clamp member 116 by a spherical connection 122. Also, one end of each hydraulic damper 50 and 52 is connected to the cross-member 118 of the associated hinge member by a spherical connection 124, while the other end of each hydraulic damper 50 and 52 is connected by a spherical connection 126 to the clamp member 114.

The linkage mechanism which comprises the four link members 54, 56, 58, and 60, and the two slider assemblies 62 and 64, ensures that the longitudinal center axis of the shaft member 36 is perpendicular to the longitudinal center axis A of the bus 10 (as seen in FIG. 2) when traveling straight ahead, and always bisects the deflection angle between the front and rear sections 12 and 14 when the bus is in a turn. This is important because (as best seen in FIG. 9) the outer ends of the shaft member 36 are rigidly connected to the lower portions 128 and 130 of a conventional hoop member (not shown) which supports the previously described bellows 17 (FIGS. 1 and 2) between the front and rear sections of the bus. Therefore, by maintaining the shaft member 36 and the hoop member at equal distances from the front and rear sections, the accordian folds of the bellows are properly arranged as the bus 10 moves through a turn.

Figure 10:
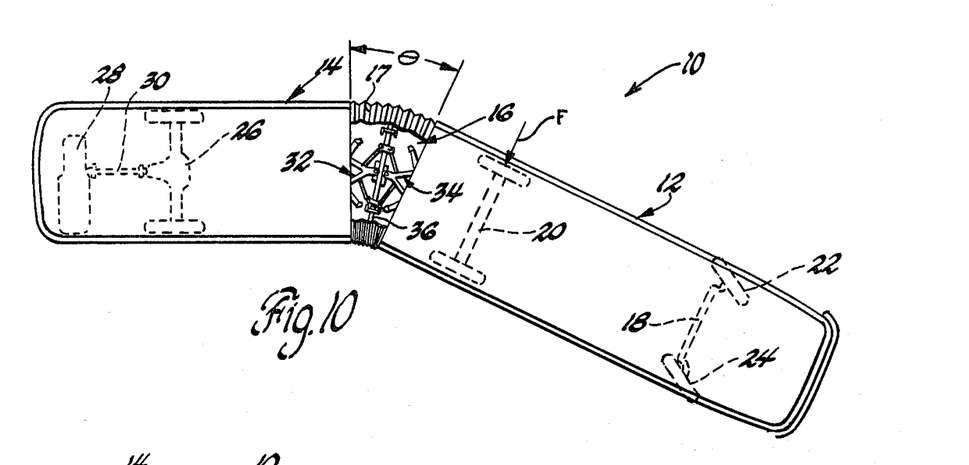
FIG. 10 is a plan view of the articulated bus showing the relative positions of the front and rear sections when the bus is traveling forwardly and simultaneously negotiating a turn.
Figure 11:
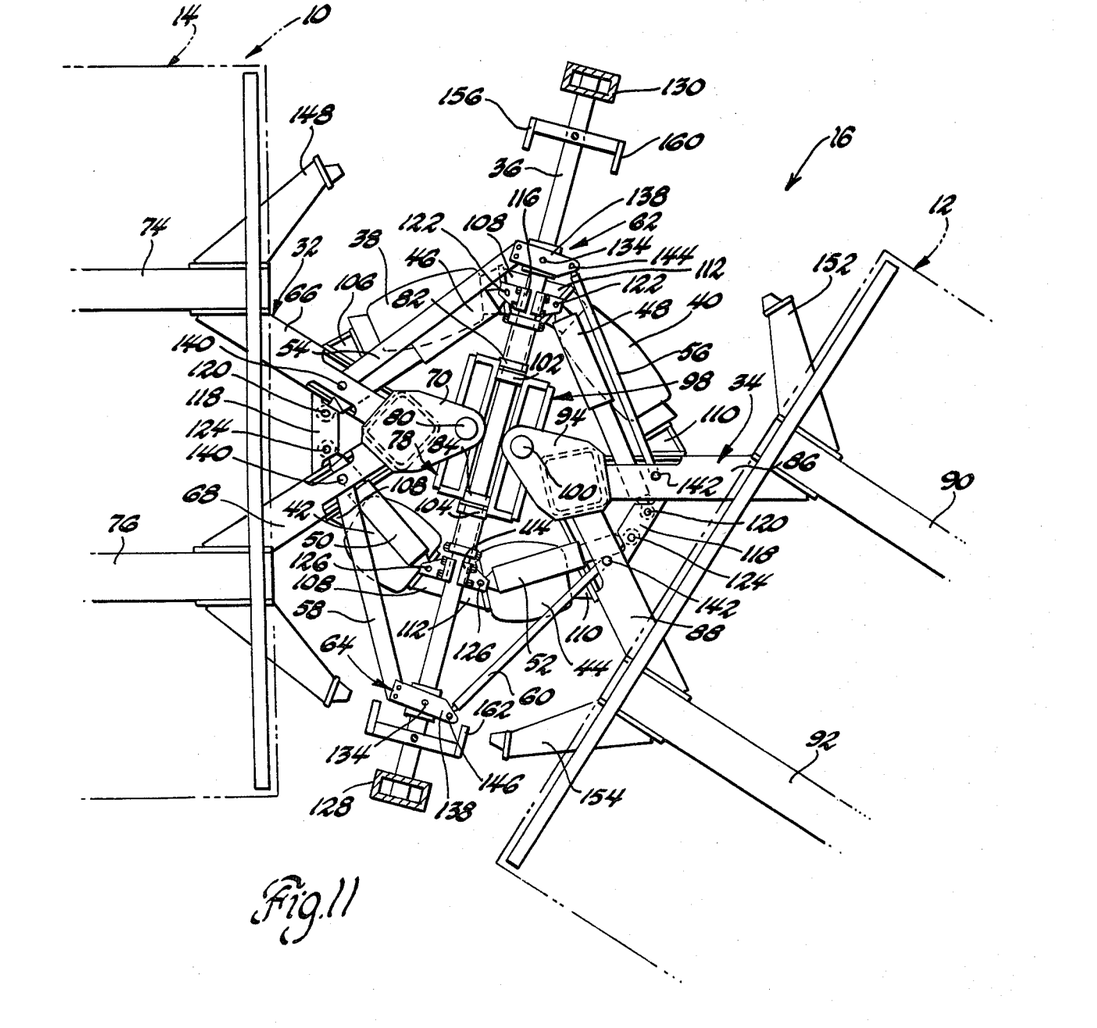
FIG. 11 is an enlarged plan view of the hinge connection similar to that of FIG. 3, but shows the positions assumed by the various parts of the hinge connection when the front and rear sections are angled, as seen in FIG. 10.

The positioning of the shaft member 36 by the linkage mechanism as explained above is also important because it ensures that the vertical center axes of the trunnion pins 80 and 100 are located and maintained along the longitudinal center axis A when the bus 10 is traveling in a straight-ahead direction (as seen in FIG. 2) and that when the bus 10 is in a turn, as seen in FIGS. 10 and 11, the longitudinal center axis of the rear section 14 that passes through the vertical center axis of the pin 80 and the longitudinal center axis of the front section 12 that passes through the vertical center axis of the pin 100 will intersect at a common point located in a vertical plane passing through the longitudinal center axis of the shaft member 36.

Figure 6:
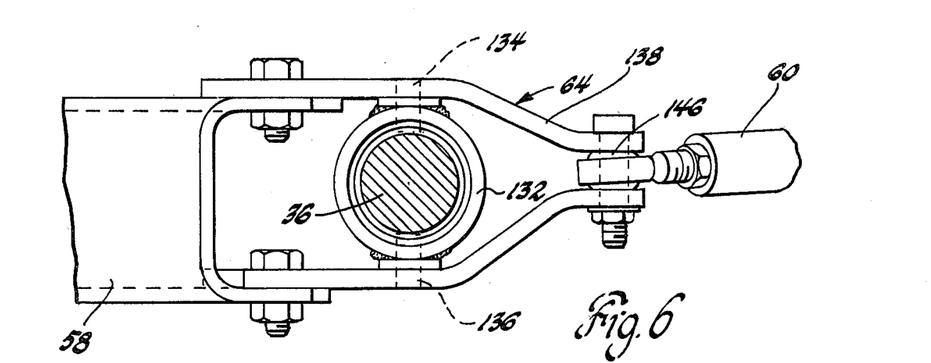
FIG. 6 is a further enlarged elevational view taken on line 6—6 of FIG. 3 and shows the joint between the links and the shaft member which form a portion of the hinge connection of the present invention.
Figure 7:
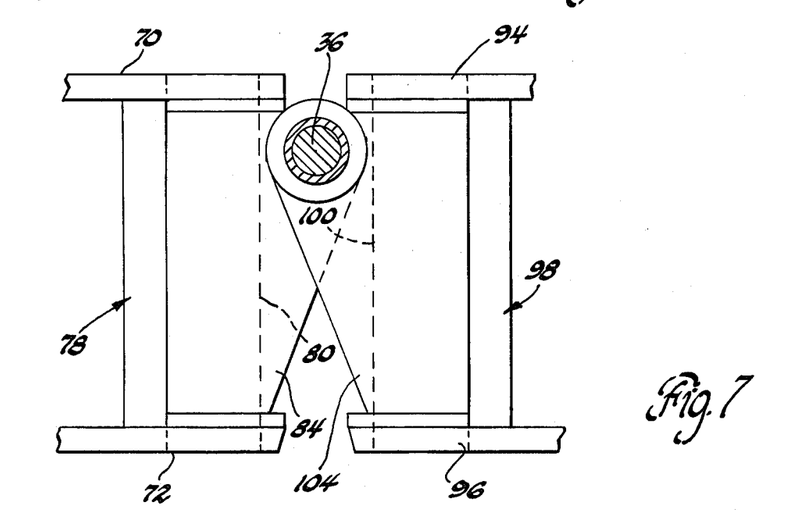
FIG. 7 is a further enlarged elevational view taken on line 7—7 of FIG. 3 and shows the longitudinally spaced vertical pivot axes of the hinge connection about which the front and rear sections of the bus are angularly displaceable.

The two slider assemblies 62 and 64 are identical in construction and, as seen in FIG. 6, each assembly 62 and 64 comprises a ring member 132 having a pair of vertically aligned pins 134 and 136 fixed thereto. The ring member 132 is adapted to slide along the shaft member 36, and the pins 134 and 136 on the ring member 132 support a two-part bracket member 138 fixedly bolted to the outboard end of the link member 54 or 58, as the case may be. Thus the outboard end of each link member 54 and 58 is adapted to pivot about the vertical axis passing through the aligned centers of the pins 134 and 136 of the associated slider assembly. It will be noted that, as seen in FIG. 3, the link members 54 and 58 are identical in construction and each has the inboard end thereof connected to the hinge member 32 by a pivotal connection 140. It will also be noted that the link members 56 and 60 are identical in construction and each has the inboard end thereof connected by a spherical connection 142 to the hinge member 34. The outboard end of the link member 56 is connected to the bracket member 138 of the slider assembly 62 by a spherical connection 144, and the outboard end of the link member 60 is connected to the bracket member 138 of the slider assembly 64 by a spherical connection 146.

Figure 4:
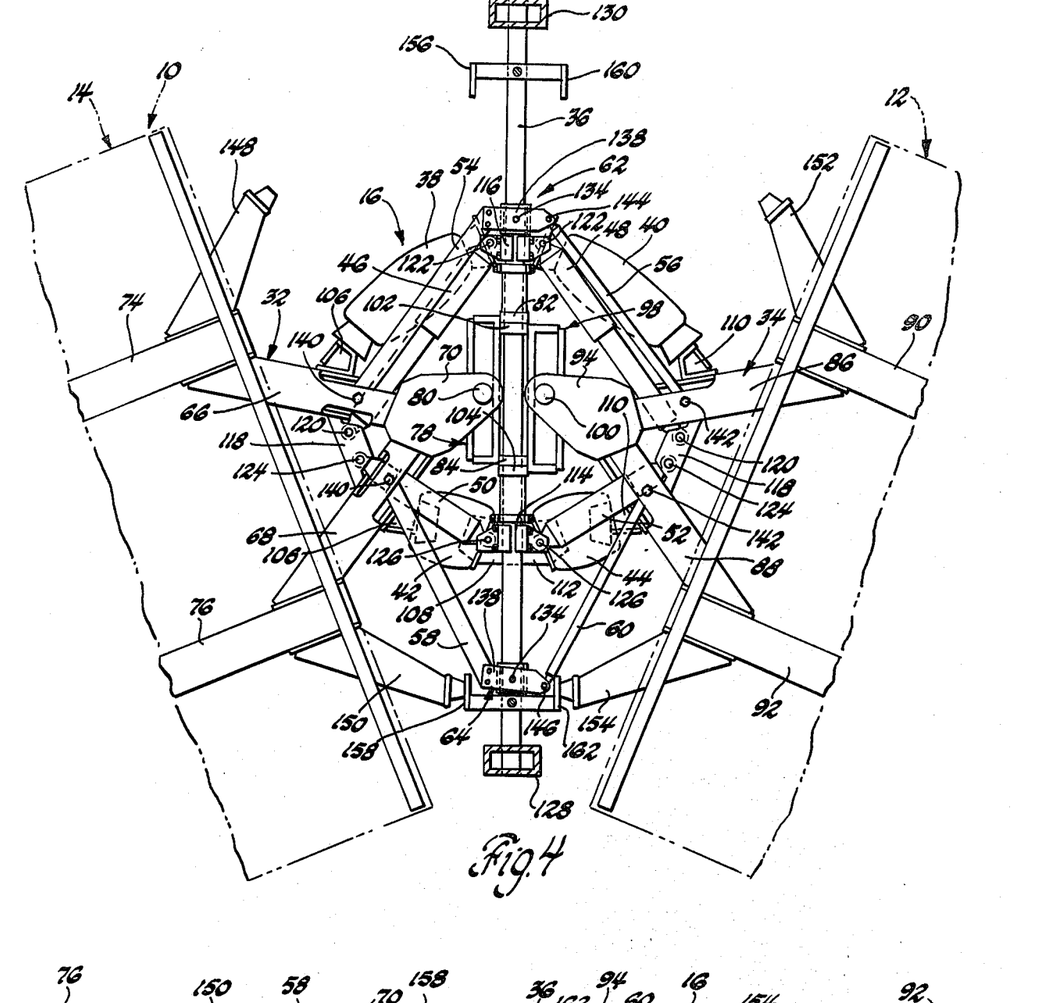
FIG. 4 is a plan view similar to that of FIG. 3, but shows the positions assumed by the various parts of the hinge connection when the articulated bus is moving in reverse and the front and rear sections reach the limits of angular displacement.

It is well known that if the two sections of a two-section vehicle, such as the bus 10, are not longitudinally aligned during reverse movement thereof, the angularity between the two sections tends to increase unless the dirigible front wheels are turned properly and sufficiently to prevent this from happening. For this reason, the hinge connection 16 described above is provided with four bumper members 148, 150, 152, and 154, and four bumper plates 156, 158, 160, and 162—arranged in pairs along each side of the hinge members 32 and 34. As seen in FIG. 4, the bumper members 150 and 154 are secured to the frame members 76 and 92, respectively, and are adapted to contact the bumper plates 158 and 162 fixed to one end of the shaft member 36 to thereby limit clockwise angular movement of the front section 12 relative to the rear section 14 when, during reverse movement of the bus 10, the dirigible wheels 22 and 24 of the front axle 18 (as seen in FIG. 10) are turned so as to cause a continuous increase in articulation angle between the front and rear sections. Similarly, the bumper members 148 and 152, secured respectively to the frame members 74 and 90, are adapted to contact the bumper plates 156 and 160 fixed to the other end of the shaft member 36 to thereby limit counterclockwise angular displacement of the front section 12 relative to the rear section 14 during reverse movement of the bus 10.

The hinge connection 16 described above operates as follows: Assuming the front and rear sections 12 and 14 of the articulated bus 10 are longitudinally aligned, the front dirigible wheels 22 and 24 are positioned for straight-ahead travel, and the wheels of the driven axle 26 are connected to the engine 28 for forward movement as seen in FIG. 2, the result is that the rear section 14 applies a pushing force to the front section 12 through the hinge connection 16 to cause the bus 10 to move straight ahead in the direction of the the arrow 31. During such time the air-springs 38, 40, 42, and 44 are maintained at the same pressure by the air control system shown in FIG. 8 which includes a source 164 of pressurized air connected through a pressure control valve 166, a solenoid valve 168, and a pair of one-way check valves 170 and 172, to the air-springs 38–44. As a result, the air-springs 38–44 serve to apply an equal-and-opposite torque to the front and rear sections 12 and 14 about the longitudinally spaced vertical pins 80 and 100 while the latter pins are being maintained in longitudinal alignment by the above-described linkage mechanism as the articulated bus 10 moves in the straight-ahead direction.

Figure 8:
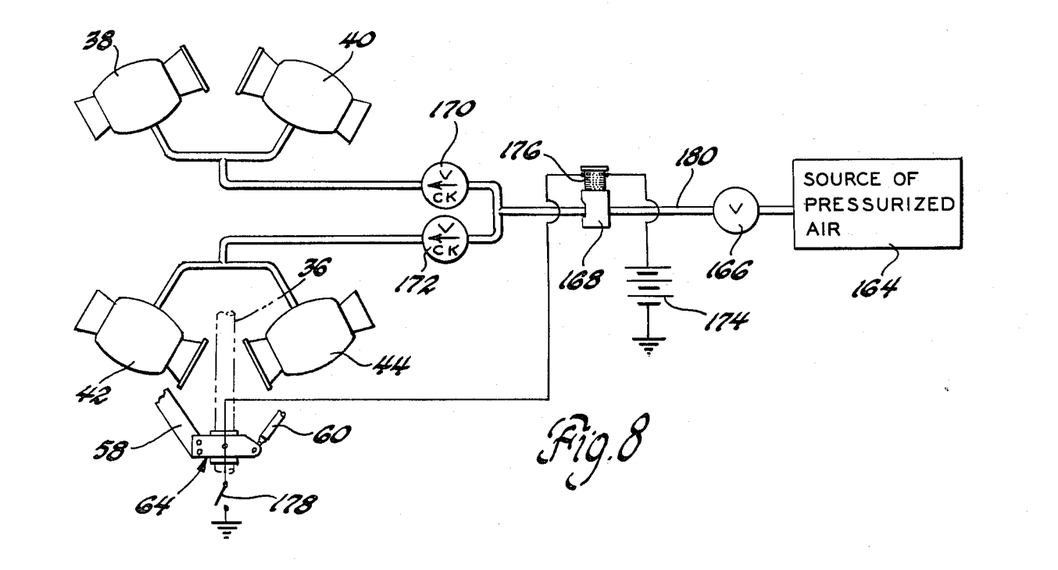
FIG. 8 is a schematic diagram of the air control system which supplies pressurized air to the air-springs incorporated with the hinge connection.

Prior to describing the operation of the hinge connection 16 when the bus 10 enters a turn, it will be noted that the air control system of FIG. 8 includes an electric circuit which receives power from a battery 174. The battery 174 is connected in series with the coil 176 of the solenoid valve 168 and a normally open switch 178. The switch 178 is mounted on the shaft member 36 and when closed, it serves to energize the coil 176 whereupon the airline 180 leading to the air-springs 38–44 is closed so as to interrupt the supply of pressurized air from the source 164 to the air-springs 38–44. The switch 178 is designed so that it will be closed by the slider assembly 64 whenever the angularity between the front and rear sections 12 and 14 at the hinge connection 16 exceeds +2 or −2 degrees from the longitudinal alignment of the front and rear sections 12 and 14.

As the front section 12 of the articulated bus 10, seen in FIG. 2 moves straight ahead—and assuming the front wheels 22 and 24 are turned gradually in a clockwise direction—the bus 10 will start to turn to the right. During the initial part of the turn and as soon as the front and rear sections are angled 2 degrees from the straight-ahead aligned position, the slider member 64 will close the switch 178 as explained above and thereby interrupt air supply to both pairs of air-springs 38,42; 40,44. As the bus 10 continues to move in the turn—with the wheels 22 and 24 turned to the positions shown in FIG. 10—the front and rear sections will be angled or deflected relative to each other an amount shown in FIGS. 10 and 11 and indicated by the angle $\theta$. Also, as the front and rear sections move from the straight-ahead aligned position of FIGS. 2 and 3 to the angled position of FIGS. 10 and 11, the link members 54,56,58, and 60 cause the two slider assemblies 62 and 64 to move along the shaft member 36 and assume the positions shown in FIG. 11. As a result, the shaft member 36 is positioned so that its longitudinal center axis bisects the angle $\theta$, and the pins 80 and 100 of the hinge members 32 and 34, respectively, are properly positioned relative to each other for the turn. At the same time, the air-springs 38 and 40 are expanded and the air-springs 42 and 44 are compressed. This then causes the air-springs 38-44 to apply a "straightening" torque about the pins 80 and 100 that tends to align the front and rear sections of the bus 10. This straightening torque serves to reduce the side force F (FIG. 10) on the tires of the center axle 20 caused by the traction being applied to the tires of the rear axle 26. On a high-friction road surface the straightening torque is not required for the bus 10 to satisfactorily negotiate turns. However, on a low-friction road surface, the straightening torque serves an important function in that it helps maintain hinge-angle stability as the bus 10 moves in a turn and traction is applied to the tires of the rear axle 26.

As should be apparent to those skilled in the art to which this invention pertains, the hinge connection 16 does not necessarily have to use air-springs to operate as described above. Coil springs or other suitable spring means can be substituted for the air-springs. It should be noted, however, that the springs used should have a spring rate which will permit angular displacement of the two sections 12 and 14 without sideslip of the center axle tires when the articulated bus is negotiating a turn on a low-friction road surface; and also serve to reduce the tire side force on the center axle when the bus is in such turn and tractive force is applied to the drive axle tires. Therefore, the choice of the spring rate provided by the springs will depend upon the selection of a satisfactory compromise between the limits of maneuverability and acceleration of the bus on slippery surfaces. Also, although not shown, it will be understood that the top portion of the hoop which supports the bellows 17 will incorporate a control linkage to ensure that the upper part of the hoop will stay at equal distances from the front and rear sections 12 and 14, regardless of their relative pitch oscillations.

A prototype articulated bus has been constructed utilizing a hinge connection made in accordance with the present invention and described above. This hinge connection employed air-springs which provided a spring rate of 8,000 lb-ft/rad., and the hydraulic dampers used had a value of approximately 30,000 lb-ft-sec/rad. The parameters of the front and rear sections of the prototype were as follows:

| FRONT SECTION | |
|---|---|
| Wheel base | 240 inches |
| Weight | 18,000 lbs. |
| Track width of front tires | 87 inches |
| Type of front tires | 12½ × 22½ |
| Track width of center axle tires | 76 inches |
| Type-dual tires each end of center axle | 12½ × 22½ |
| Distance from center of hinge connection to center of center axle | 60 inches |
| Yaw inertia | 60,000 lb-ft-sec$^2$ |
| REAR SECTION | |
| Weight | 18,000 lbs. |
| Track width of rear axle tires | 76 inches |
| Type-dual tires each end of rear axle | 12½ × 22½ |
| Distance from center of hinge connection to center of rear axle | 180 inches |
| Yaw inertia | 25,000 lb-ft-sec$^2$ |

Various modifications and changes may be made in the construction of the invention without departing from the spirit of the invention. Such changes and modifications are contemplated by the inventor, and he does not wish to be limited except by the scope of the appended claims.

The embodiments of the invention for which an exclusive property or privilege is claimed are defined as follows:

1. A hinge connection for interconnecting the front section with the rear section of an articulated vehicle, said hinge connection comprising a shaft member having a longitudinal center axis adapted to be located in a horizontal plane between said front section and said rear section and to extend transversely relative to said articulated vehicle; a first hinge member adapted to be secured to said front section; a second hinge member adapted to be secured to said rear section; means connecting said first hinge member and said second hinge member to said shaft member so as to allow said front section to be angularly displaced relative to said rear section about a pair of longitudinally spaced vertical axes and about said longitudinal center axis of said shaft member so as to permit said articulated vehicle to negotiate turns and to travel over crests and valleys in a road surface; and means operatively connected between each of said first and second hinge members and said shaft member for maintaining said pair of spaced vertical axes aligned and located along the longitudinal center axis of said articulated vehicle during straight-ahead travel thereof and for positioning said shaft member so that said longitudinal center axis of said shaft member bisects the turn angle between said front section and said rear section when said articulated vehicle is in a turn.

2. A hinge connection for interconnecting the front section with the rear section of an articulated vehicle wherein said rear section has a driven rear axle and said front section has a nondriven center axle and a pair of front dirigible wheels, said hinge connection comprising a shaft member having a longitudinal center axis adapted to be located in a horizontal plane between said front section and said rear section and extend transversely relative to said articulated vehicle; a first hinge member adapted to be secured to said front section; a second hinge member adapted to be secured to said rear section; means connecting said first hinge member and said second hinge member to said shaft member so as to allow said front section to pivot relative to said rear section about a pair of longitudinally spaced vertical axes when said articulated vehicle is in a turn and to pivot about said longitudinal center axis of said shaft member when said articulated vehicle is traveling over crests and valleys in a road surface; and a linkage mechanism operatively connected between each of said first and second hinge members and said shaft member for maintaining said pair of spaced vertical axes aligned and located along the longitudinal center axis of said articulated vehicle during straight-ahead travel thereof and for positioning said shaft member so that said longitudinal center axis of said shaft member bisects the turn angle between said front section and said rear section when said articulated vehicle is in a turn.

3. A hinge connection for interconnecting the front section with the rear section of an articulated vehicle wherein said rear section has a driven rear axle and said front section has nondriven center and front axles the latter of which is provided with a pair of dirigible wheels, said hinge connection comprising a shaft member having a longitudinal center axis adapted to be located in a horizontal plane between said front section and said rear section and extend transversely relative to said articulated vehicle; a first hinge member adapted to be secured to the rear end of said front section; a second hinge member adapted to be secured to the front end of said rear section; means connecting said first hinge member and said second hinge member to said shaft member so as to allow said front section to pivot relative to said rear section about a pair of longitudinally spaced vertical axes when said articulated vehicle is in a turn and to pivot about said longitudinal center axis of said shaft member when said articulated vehicle is traveling over crests and valleys in a road surface; means operatively connecting said first and second hinge members to said shaft member for maintaining said pair of spaced vertical axes aligned and located along the longitudinal center axis of said articulated vehicle during straight-ahead travel thereof and for positioning said shaft member so that said longitudinal center axis of said shaft member bisects the turn angle between said front section and said rear section when said articulated vehicle is in a turn; and spring means between said first and second hinge members for applying a straightening torque to said front and rear sections so as to reduce the side force on said center axle when said articulated vehicle is in a turn and said rear axle is being driven.

4. A hinge connection for interconnecting the front section with the rear section of an articulated vehicle wherein said rear section has a driven rear axle and said front section has a nondriven center axle and a pair of front dirigible wheels, said hinge connection comprising a shaft member having a longitudinal center axis adapted to be located in a horizontal plane between said front section and said rear section and extend transversely relative to said articulated vehicle; a first hinge member adapted to be mounted on said front section; a second hinge member adapted to be mounted on said rear section; means connecting said first hinge member and said second hinge member to said shaft member so as to allow said front section to pivot relative to said rear section about a pair of spaced vertical axes when said articulated vehicle is in a turn and to pivot about said longitudinal center axis of said shaft member when said articulated vehicle is traveling over crests and valleys in a road surface; means operatively connecting said first and second hinge members to said shaft member for positioning said shaft member so that said longitudinal center axis of said shaft member bisects the turn angle between said front section and said rear section when said articulated vehicle is in a turn; spring means between said first and second hinge members and located below said shaft member in a horizontal plane for applying a straightening torque to said front and rear sections so as to reduce the side force on said center axle when said articulated vehicle is in a turn and said rear axle is being driven; and means located between said first and second hinge members for dampening relative movement of said first and second hinge members about said pair of spaced verticle axes due to road induced vibrations.

5. In an articulated vehicle having a rear section supporting a driven rear axle and a front section supporting a nondriven center axle and a pair of front dirigible wheels, said front section and said rear section being interconnected by a hinge connection which allows relative angular displacement of said front and rear sections in a horizontal plane about a pair of spaced vertical pivot axes and in a vertical plane about a single horizontal pivot axis; the improvement, wherein said hinge connection includes a pair of hinge members, one of said hinge members being connected to a first vertical pin; the other of said hinge members being connected to a second vertical pin which is spaced along the longitudinal center axis of said articulated vehicle from said first vertical pin; a shaft member located between said first and second vertical pins; means connecting said shaft member to said first and second vertical pins of said pair of hinge members; and a linkage mechanism including a slider assembly mounted on said shaft member and a link extending between said slider assembly and each of said pair of hinge members for positioning said shaft member so that the longitudinal center axis thereof bisects the turn angle between said front section and said rear section when said articulated vehicle is in a turn and said first and second vertical pins are maintained in alignment along said longitudinal center axis of said articulated vehicle during straight-ahead travel thereof.

6. In an articulated vehicle having a rear section supporting a driven rear axle and a front section supporting a nondriven center axle and a pair of front dirigible wheels, said front section and said rear section being interconnected by a hinge connection which allows relative angular displacement of said front and rear sections in a horizontal plane about a pair of spaced vertical pivot axes and in a vertical plane about a single horizontal pivot axis; the improvement, wherein said hinge connection includes a pair of hinge members, one of said hinge members being connected to a first vertical pin; the other of said hinge members being connected to a second vertical pin which is spaced along the longitudinal center axis of said articulated vehicle from said first vertical pin; a transversely extending shaft member located midway between said first and second vertical pins; means connecting said shaft member to said first and second vertical pins of said pair of hinge members; a linkage mechanism including a slider assembly mounted on said shaft member and a link extending between said slider assembly and each of said pair of hinge members for positioning said shaft member so that the longitudinal center axis thereof bisects the turn angle between said front section and said rear section when said articulated vehicle is in a turn; and spring means between each of said pair of hinge members and said shaft member for applying a straightening torque to said front and rear sections so as to reduce the side force on said center axle when said articulated vehicle is in a turn and said rear axle is being driven.

7. In an articulated vehicle having a rear section supporting a driven rear axle and a front section supporting a nondriven center axle and a pair of front dirigible wheels, said front section and said rear section being interconnected by a hinge connection which allows relative angular displacement of said front and rear sections in a horizontal plane about a pair of spaced vertical pivot axes and in a vertical plane about a single horizontal pivot axis; the improvement, wherein said hinge connection includes a pair of hinge members, one of said hinge members being connected to a first vertical pin; the other of said hinge members being connected to a second vertical pin which is spaced along the longitudinal center axis of said articulated vehicle from said first vertical pin; a transversely extending shaft member located midway between said first and second vertical pins; means connecting said shaft member to said first and second vehicle pins of said pair of hinge members; a linkage mechanism including a slider assembly mounted on said shaft member and a link extending between said slider assembly and each of said pair of hinge members for positioning said shaft member so that the longitudinal center axis thereof bisects the turn angle between said front section and said rear section when said articulated vehicle is in a turn; an air-spring member along each side of said articulated vehicle and positioned between said front and rear sections for applying an equal-and-opposite torque to said front and rear sections about said vertical pin of each of said pair of hinge members when said articulated vehicle is traveling in a straight-ahead direction; an air control system including a pressure-control valve for maintaining a uniform pressure in each of said air-spring members when said articulated vehicle is traveling in said straight-ahead direction; and means in said air control system responsive to turning movement of said articulated vehicle for disconnecting said pressure-control valve from said air-spring members so the air pressure in one air spring member along one side of said vehicle is greater than the air-pressure in the air-spring member along the other side of the vehicle.

* * * * *